United States Patent
Tobe et al.

(10) Patent No.: US 8,059,032 B2
(45) Date of Patent: Nov. 15, 2011

(54) POSITIONING CONTROL DEVICE AND POSITIONING CONTROL METHOD

(75) Inventors: Akiko Tobe, Yokosuka (JP); Nirou Tsuchiya, Yokohama (JP); Masayuki Tsuda, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 235 days.

(21) Appl. No.: 12/577,854

(22) Filed: Oct. 13, 2009

(65) Prior Publication Data
US 2010/0103034 A1      Apr. 29, 2010

(30) Foreign Application Priority Data

Oct. 24, 2008   (JP) .............................. P2008-274231

(51) Int. Cl.
*G01S 3/02*      (2006.01)
(52) U.S. Cl. ...................................................... 342/451
(58) Field of Classification Search ............ 342/451
See application file for complete search history.

(56) References Cited

U.S. PATENT DOCUMENTS

| | | | | |
|---|---|---|---|---|
| 7,558,696 | B2 * | 7/2009 | Vilppula et al. | .............. 702/150 |
| 2007/0021125 | A1 | 1/2007 | Zhu et al. | |
| 2007/0082681 | A1 | 4/2007 | Kim et al. | |
| 2007/0178913 | A1 * | 8/2007 | Niemenmaa et al. | ...... 455/456.4 |
| 2008/0039117 | A1 * | 2/2008 | van Diggelen et al. | ..... 455/456.1 |
| 2009/0299685 | A1 | 12/2009 | Vilppula et al. | |

FOREIGN PATENT DOCUMENTS

| | | |
|---|---|---|
| JP | 2002-150489 | 5/2002 |
| JP | 2003-78943 | 3/2003 |
| JP | 2003-302457 | 10/2003 |
| JP | 2004-502942 | 1/2004 |
| JP | 2006-252436 | 9/2006 |
| WO | WO 2007/025080 A2 | 3/2007 |
| WO | WO 2007/025080 A3 | 3/2007 |

OTHER PUBLICATIONS

Office Action issued Sep. 7, 2010 in Japanese Application No. P2008-274231 (with English translation).

* cited by examiner

*Primary Examiner* — Harry Liu
(74) *Attorney, Agent, or Firm* — Oblon, Spivak, McClelland, Maier & Neustadt, L.L.P.

(57) ABSTRACT

A positioning control device includes a GPS hardware control unit that makes GPS determine a current location at different positioning accuracies, and a positioning request management unit that makes the GPS hardware control unit carry out positioning in response to a positioning request from an application according to a positioning accuracy specified in the positioning request, acquires the positioning result, and returns the acquired positioning result to the application of the request origin. In a case where a positioning accuracy of a new positioning request is equal to or less than a positioning accuracy of a latest positioning result, the positioning request management unit reuses the latest positioning result and returns the latest positioning result in response to the new positioning request.

4 Claims, 6 Drawing Sheets

POSITIONING CONTROL DEVICE AND POSITIONING CONTROL METHOD

BACKGROUND OF THE INVENTION

1. Field of the Invention

The present invention relates to a positioning control device and a positioning control method for determining a current location based on positioning requests from a plurality of applications.

2. Related Background Art

Positioning functions such as global positioning systems (GPS) have recently come to be installed even in cell phones and other compact information devices (to be referred to as "mobile stations"), and various services are now provided based on positioning results of a current location determined by various applications (see, for example, Japanese Patent Laid-open Gazette No. 2003-078943). In these mobile stations, competition avoidance measures are employed, such as giving priority to the first request or giving priority to the latter request, in order to avoid competition over GPS resources when generating positioning requests from a plurality of applications.

However, in the case of giving priority to the first request, since a time when positioning processing of the first request will be completed is unknown and since positioning process of the latter request is carried out after completion of positioning processing of the first request, there is the problem of the standby time of the positioning request of the application generating the latter request becoming excessively long. On the other hand, in the case of giving priority to the latter request, since positioning processing is suddenly interrupted if a positioning request is made by another application while positioning processing is still in progress, there is the problem of an increase in the number of cases in which an application is unable to receive positioning results.

SUMMARY OF THE INVENTION

With this in mind, an object of the present invention is to provide a positioning control device and a positioning control method capable of shortening standby time of positioning requests and promptly returning positioning results in an environment in which positioning requests can be made simultaneously from a plurality of applications.

A positioning control device as claimed in the present invention is a positioning control device that determines a current location based on positioning requests from a plurality of applications, including: a positioning unit configured to determine a current location at a positioning accuracy specified by an application; and a positioning request management unit configured to return a positioning result obtained by the positioning unit in response to the positioning request from the application, wherein when there is a new positioning request from the application, in a case where a positioning accuracy specified in the new positioning request is equal to or less than a positioning accuracy specified in a prior positioning request, the positioning request management unit is configured to return a positioning result for responding the prior positioning request, in response to the new positioning request.

A positioning control method as claimed in the present invention is a positioning control method for determining a current location based on positioning requests from a plurality of applications, including: a positioning step of determining a current location at a positioning accuracy specified by an application; and a positioning request management step of returning a positioning result obtained in the positioning step in response to the positioning request from the application, wherein when there is a new positioning request from the application, in a case where a positioning accuracy specified in the new positioning request is equal to or less than a positioning accuracy of a latest positioning result determined for a prior positioning request, the latest positioning result for responding the prior positioning request is returned in response to the new positioning request in the positioning request management step.

According to the positioning control device and the positioning control method as claimed in the present invention, positioning requests having a specified positioning accuracy are transmitted from a plurality of applications, and when a new positioning request is transmitted from an application, in a case where a positioning accuracy specified in the new positioning request is equal to or less than a positioning accuracy of a positioning result for responding a prior positioning request, instead of newly carrying out positioning, the positioning result for responding the prior positioning request is returned, thereby making it possible to shorten standby time of positioning requests and promptly return positioning results without lowering positioning accuracy.

In a case where a new positioning request is received before returning a positioning result in response to a prior positioning request, the positioning request management unit is preferably configured to return the positioning result for responding the prior positioning request, in response to the new positioning request. According to this positioning control device, if a new positioning request is received before returning a positioning result in response to a prior positioning request, when the positioning result for responding the prior positioning request has been obtained, the positioning result for responding the prior positioning request is returned in response to the new positioning request, thereby making it possible to further shorten standby time of the new positioning request.

On the other hand, in a case where a new positioning request is received within a prescribed amount of time after returning a positioning result in response to a prior positioning request, the positioning request management unit is preferably configured to return the positioning result for responding the prior positioning request, in response to the new positioning request. According to this positioning control device, there is considered to be little fluctuation in the current location for which positioning is carried out if a positioning result for responding a prior positioning request is returned within a prescribed amount of time. Consequently, in such cases, by returning the positioning result for responding a prior positioning request in response to a new positioning request, standby time of the new positioning request can be further shortened while inhibiting decreases in reliability of positioning results.

According to the present invention, standby time of positioning requests can be shortened and positioning results can be returned promptly in an environment in which positioning requests can be simultaneously transmitted from a plurality of applications.

DESCRIPTION OF THE PREFERRED EMBODIMENTS

The following provides an explanation of embodiments of the positioning control device and positioning control method as claimed in the present invention with reference to the drawings. In the present embodiment, an explanation is provided of the positioning control device according to the present invention when applied to a cell phone or other mobile stations. Furthermore, the same reference symbols are used to indicate the same constituents in each drawing, and repeated explanations thereof are omitted.

Figure 1:
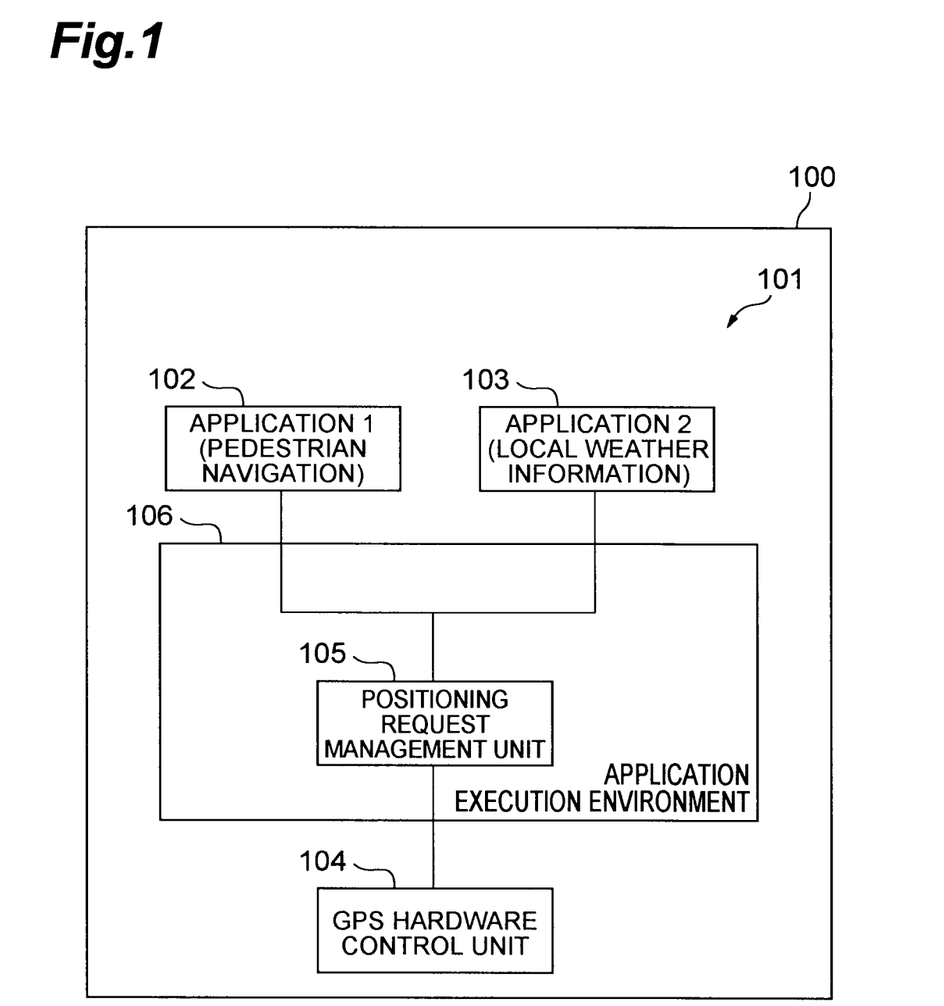
FIG. 1 is a system block diagram showing a positioning control device as claimed in the present embodiment.

FIG. 1 is a system block diagram showing a positioning control device in the present embodiment. As shown in FIG. 1, a positioning control device 101 in the present embodiment is installed in a mobile station 100, and is a device that determines the current location of the mobile station 100 based on positioning requests from a plurality of applications 102 and 103. The positioning control device 101 includes a GPS hardware control unit 104 for determining a current location, and a positioning request management unit 105 for receiving positioning requests from each of the applications 102 and 103.

The GPS hardware control unit 104 acquires the current location of the mobile station 100 by receiving instructions from the positioning request management unit 105 and having GPS determine the current location. In addition, the GPS hardware control unit 104 is able to make GPS determine the current location of the mobile station 100 at a different positioning accuracy, and has two types of positioning modes composed of, for example, a quality-emphasized mode having high positioning accuracy and a standard mode having low positioning accuracy. The quality-emphasized mode has a longer timeout time and acquires positioning results with higher accuracy than the standard mode. On the other hand, the standard mode acquires and returns positioning results within a specified amount of time even if there is an increase in accuracy error.

The positioning request management unit 105 returns positioning results acquired by the GPS hardware control unit 104, in response to positioning requests from the applications 102 and 103. When a positioning request is received from the application 102 or 103, the positioning request management unit 105 makes the GPS hardware control unit 104 determine a current location. The positioning request management unit 105 specifies either the quality-emphasized mode or the standard mode according to the positioning accuracy specified in the positioning request received from the application 102 or 103, and then makes the GPS hardware control unit 104 determine the current location of a mobile station.

In addition, when a new positioning request is received from either the application 102 or 103, the positioning request management unit 105 waits for the acquisition of the latest positioning result for responding a prior positioning request, and compares the positioning accuracy of the new positioning request with the positioning accuracy of the latest positioning result. If the positioning accuracy of the new positioning request is equal to or lower than the positioning accuracy of the latest positioning result, the positioning request management unit 105 reuses the latest positioning result without making the GPS hardware control unit 104 carry out new positioning, and then returns the latest positioning result in response to the new positioning request.

Figure 2:
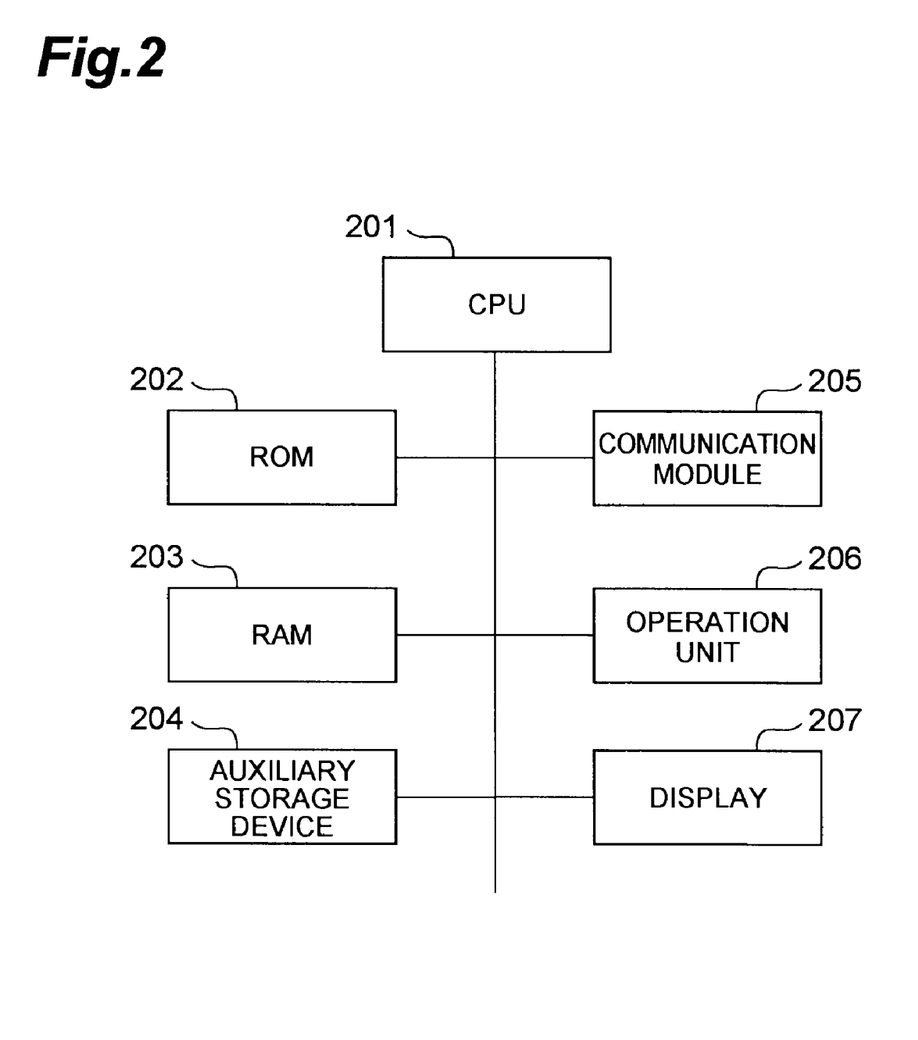
FIG. 2 is a drawing showing an example of the hardware configuration of a positioning control device.

FIG. 2 is a drawing showing an example of the hardware configuration of a positioning control device. As shown in FIG. 2, the positioning control device 101 operates as a function of the mobile station 100, and is physically provided with a CPU 201, a ROM 202, a RAM 203, an auxiliary storage device 204, a communication module 205, an operation unit 206 and a display 207. Each function explained in FIG. 1 is realized by reading and writing data in the RAM 203 and the auxiliary storage device 204 together with operating the communication module 205 under the control of the CPU 201 by installing a prescribed computer software in the CPU 201 and the RAM 203 shown in FIG. 2.

The application 102 is a "pedestrian navigation" application capable of providing two types of services composed of a service that displays, on the mobile station 100, a detailed map corresponding to current positioning results for a user (positioning results) (to be referred to as a "current location display service"), and a service that displays, on the mobile station 100, a list of nearby eating and drinking establishments corresponding to the positioning result (to be referred to as a "nearby facility search function"). Within the "pedestrian navigation" application, although the "current location display service" requires a highly accurate positioning result to display the current location of the pedestrian (mobile station 100), the "nearby facility search function" is able to provide adequate service using standard accuracy positioning results.

The application 103 is a "local weather information" application that has a function for displaying weather forecast information for the area in which the mobile station is located, on the mobile station. This "local weather information" application is able to provide adequate service even with positioning results having a comparatively low level of accuracy (standard accuracy or lower).

Figure 3:
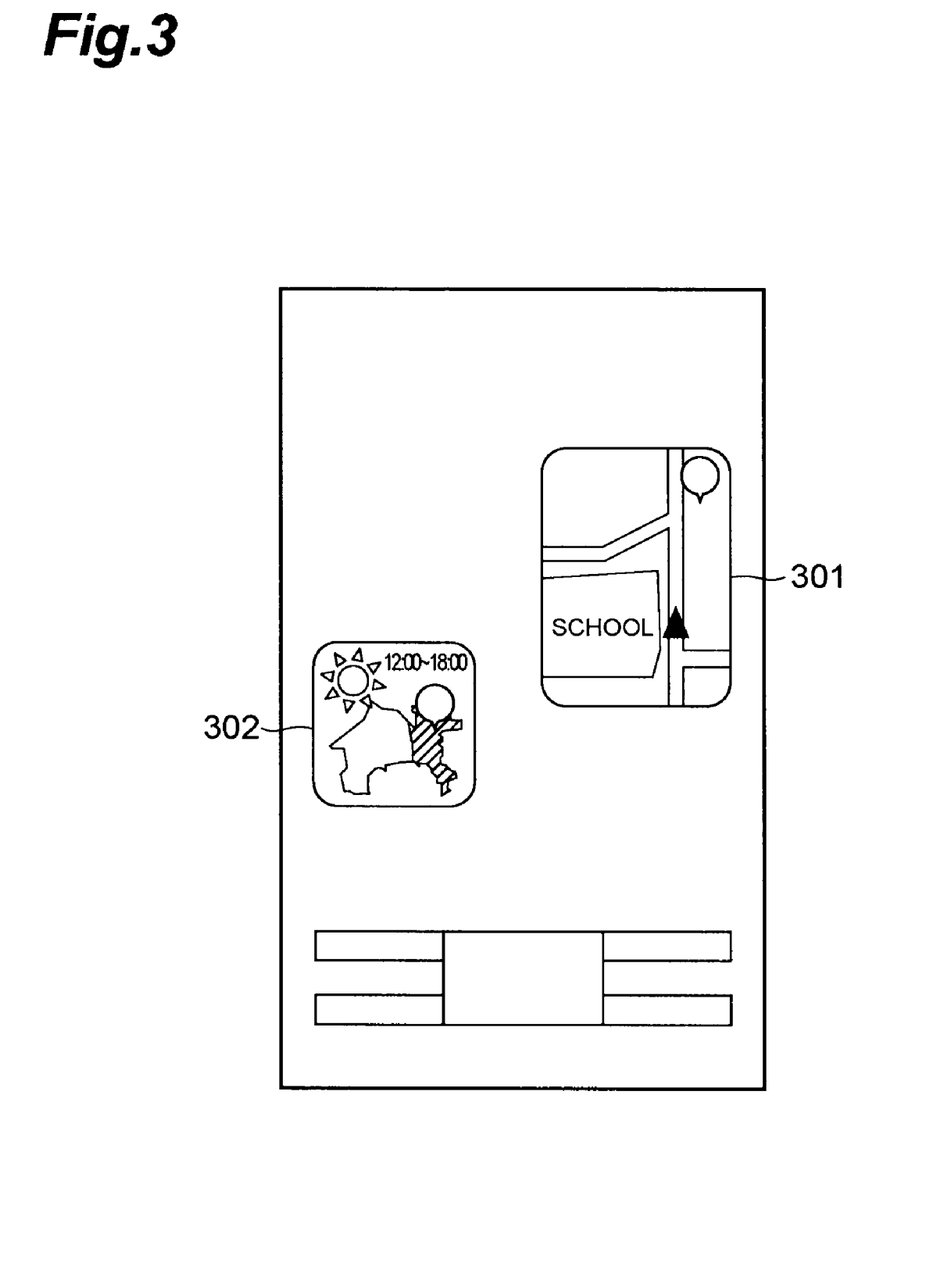
FIG. 3 is a drawing showing an example of a display screen of a mobile station.

FIG. 3 is a drawing showing an example of a display screen of a mobile station. In FIG. 3, the "pedestrian navigation" application and the "local weather information" application simultaneously provide services in the mobile station 100, reference symbol 301 is the drawing represents a display window of the "pedestrian navigation" application, while reference symbol 302 represents a display window of the "local weather information" application.

Figure 4:
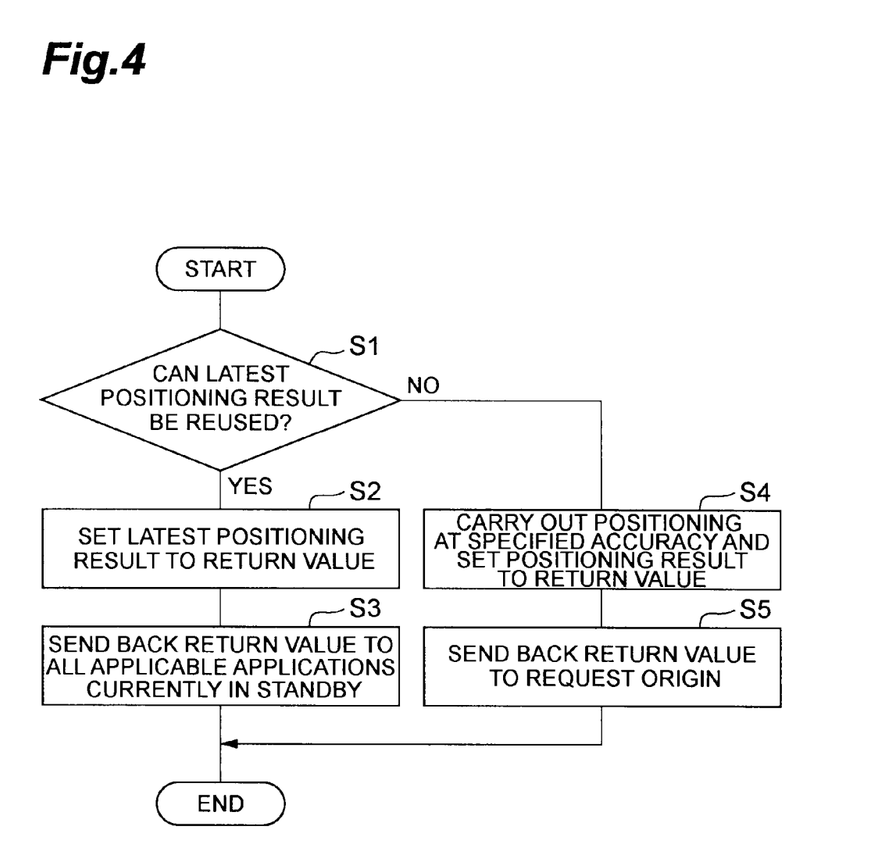
FIG. 4 is a flow chart for explaining the processing operation of a positioning request management unit.
Figure 5:
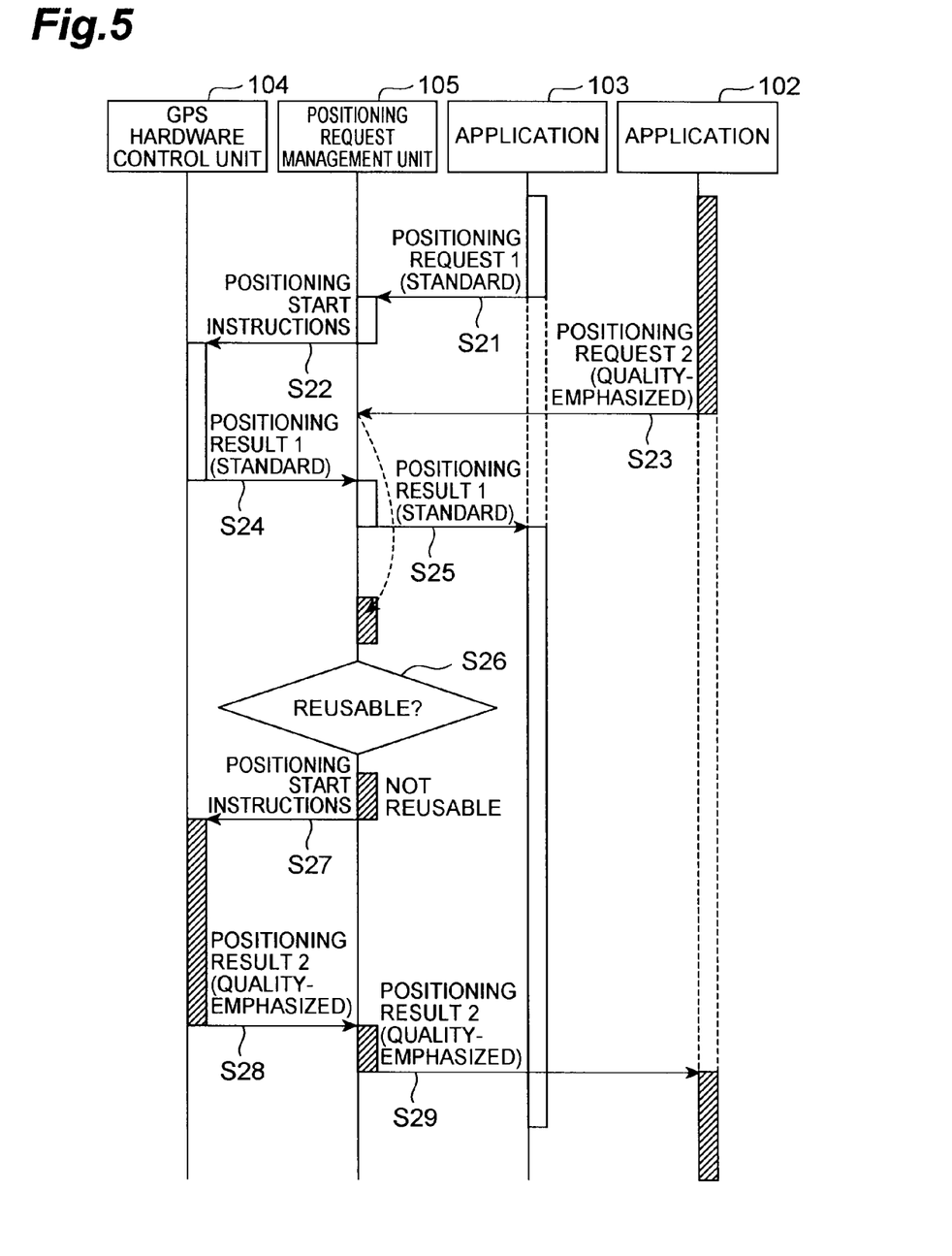
FIG. 5 is a sequence diagram for explaining an example of the processing operation of a positioning control device in the case of not reusing the latest positioning result.
Figure 6:
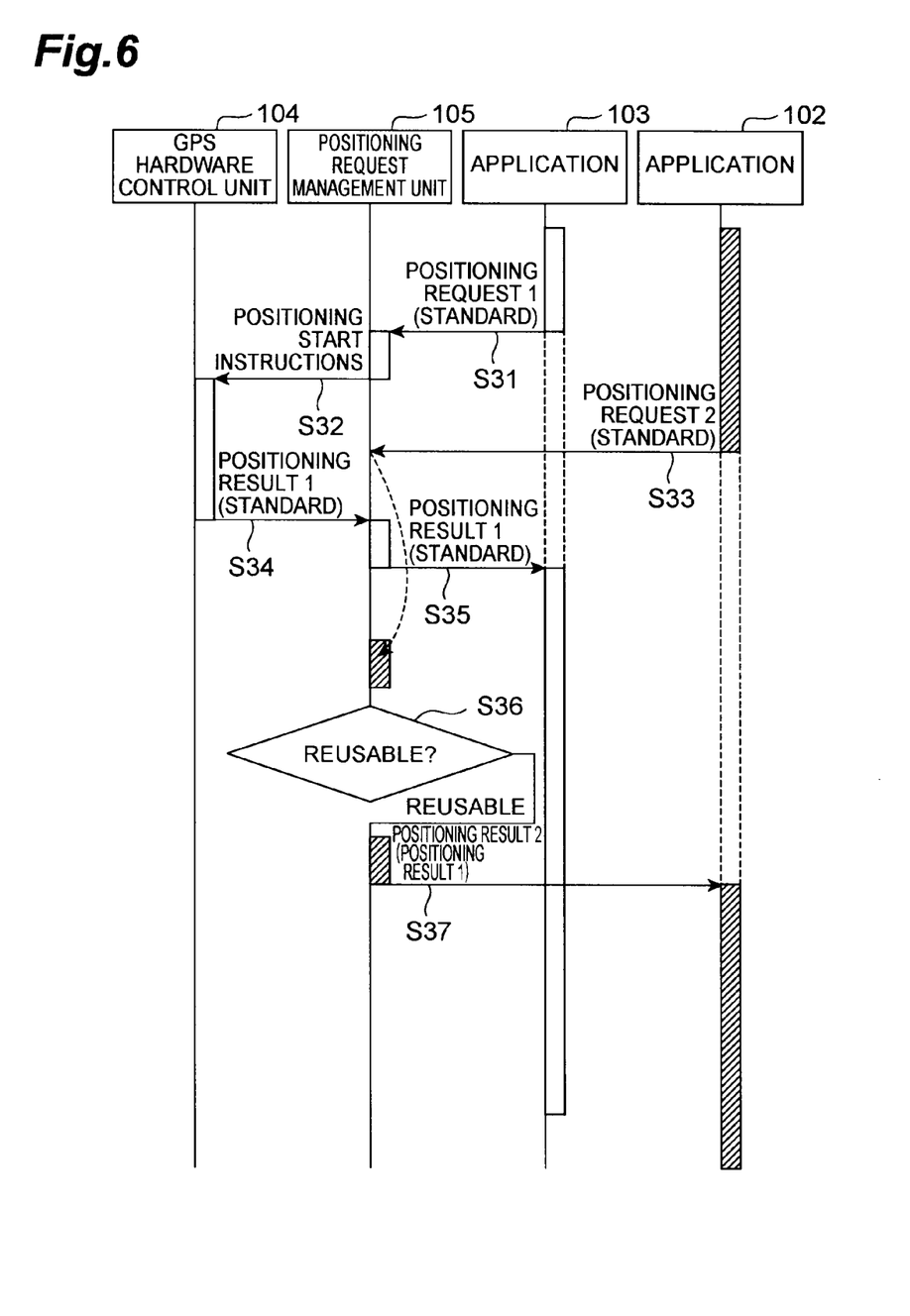
FIG. 6 is a sequence diagram for explaining an example of the processing operation of a positioning control device in the case of reusing the latest positioning result.

Next, with reference to FIGS. 4 to 6, an explanation is provided of the operation of the positioning control device 101 in the present embodiment. FIG. 4 is a flow chart for explaining the processing operation of the positioning request management unit, FIG. 5 is a sequence diagram for explaining an example of the operation processing of the positioning control device in the case of not reusing the latest positioning result, and FIG. 6 is a sequence drawing for explaining an example of the processing operation of the positioning control device in the case of reusing the latest positioning result.

As shown in FIG. 4, when a positioning request is received from the application 102 or 103, the positioning request management unit 105 determines whether or not the latest positioning result can be reused (Step S1).

In Step S1, in a case where it has been determined that the latest positioning result can be reused (Yes in Step S1), the positioning request management unit 105 sets the latest positioning result to a return value that is returned to the request-origin application 102 or 103 (Step S2). At this time, in a case where the latest positioning result was in error, error information is set for the return value.

The positioning request management unit 105 then returns the return value set in Step S2 to all applications capable of being applied that are currently in standby (Step S3). Namely, the positioning request management unit 105 returns the return value set in Step S2 to all applications that are request origins of positioning requests for which the latest positioning result has been determined to be able to be reused in Step S1 and are currently waiting for a return value to be returned.

On the other hand, in the above-mentioned Step S1, in a case where the latest positioning result has been determined to be unable to be reused (No in Step S1), the positioning request management unit 105 makes the GPS hardware control unit 104 determine the current location at the positioning accuracy specified in a new positioning request, and sets the positioning result acquired from the GPS hardware control unit 104, to a return value (Step S4). At this time, in a case where the positioning result acquired from the GPS hardware control unit 104 was in error, error information is set for the return value.

The positioning result management unit 105 then proceeds to the previously described Step S5, and returns a return value that is the positioning result or a return value that is error information, to the application of the request origin (Step S5).

Next, an explanation is provided of an example of the processing operation of the positioning control device in the case of not reusing the latest positioning result with reference to FIG. 5. Furthermore, shaded portions of FIG. 5 indicate processing related to the application 102.

As shown in FIG. 5, when there is a positioning request 1 having positioning accuracy of standard mode transmitted from the application 103 to the positioning request management unit 105 (Step S21), the positioning request management unit 105 transmits positioning start instructions to the GPS hardware control unit 104 and makes the GPS hardware control unit 104 carry out positioning in the standard mode (Step S22).

If there is a positioning request 2 having positioning accuracy of quality-emphasized mode transmitted from the application 102 to the positioning request management unit 105 while the GPS hardware control unit 104 is carrying out positioning in the standard mode (Step S23), the positioning request management unit 105 makes the positioning request 2 from the application 102 wait until a positioning result 1 for the positioning request 1 is acquired from the GPS hardware control unit 104. Namely, the positioning request management unit 105 makes the positioning request 2 wait by holding the positioning request 2 by queue management and the like, until the positioning result 1 is acquired.

Subsequently, when the positioning result 1 is transmitted from the GPS hardware control unit 104 to the positioning request management unit 105 (Step S24), the positioning request management unit 105 returns the acquired positioning result 1 to the application 103 (Step S25). The positioning request management unit 105 then determines whether or not the positioning result 1 acquired in Step S24 can be reused for the positioning request 2 from the application 102 (Step S26). In this case, since the positioning accuracy specified in the positioning request 2 from the application 102 is that of the quality-emphasized mode in contrast to the positioning accuracy of the positioning result 1 acquired in Step S24 being that of the standard mode, the positioning request management unit 105 determines that the positioning result 1 acquired in Step S24 cannot be reused.

Therefore, the positioning request management unit 105 transmits positioning start instructions to the GPS hardware control unit 104 and makes the GPS hardware control unit 104 carry out positioning in the quality-emphasized mode (Step S27), and when a positioning result 2 having positioning accuracy of quality-emphasized mode is transmitted from the GPS hardware control unit 104 to the positioning request management unit 105 (Step S28), the positioning request management unit 105 returns the acquired positioning result 2 to the application 102 (Step S28).

The following provides an explanation of an example of the processing operation of the positioning control device in the case of being able to reuse the latest positioning result with reference to FIG. 6. Furthermore, the shaded portions of FIG. 6 indicate processing related to the application 102.

As shown in FIG. 6, when there is a positioning request 1 having positioning accuracy of standard mode for the positioning request management unit 105 from the application 103 (Step S31), the positioning request management unit 105 transmits positioning start instructions to the GPS hardware control unit 104 and makes the GPS hardware control unit 104 carry out standard mode positioning (Step S32).

If there is a positioning request 2 having positioning accuracy of standard mode for the positioning request management unit 105 from the application 102 while the GPS hardware control unit 104 is carrying out standard mode positioning (Step S33), the positioning request management unit 105 makes the positioning request 2 from the application 102 wait until a positioning result 1 for the positioning request 1 is acquired from the GPS hardware control unit 104. Namely, the positioning request management unit 105 makes the positioning request 2 wait by holding the positioning request 2 by queue management and the like, until the positioning result 1 is acquired.

Subsequently, when the positioning result 1 is transmitted from the GPS hardware control unit 104 to the positioning request management unit 105 (Step S34), the positioning request management unit 105 returns the positioning result 1 to the application 103 (Step S35). The positioning request management unit 105 then determines whether or not the positioning result 1 acquired in Step S34 can be reused for the positioning request 2 from the application 102 (Step S36). In this case, since the positioning accuracy of the positioning result 1 acquired in Step S34 and the positioning accuracy specified in the positioning request 2 from the application 102 are both the same standard mode, the positioning request management unit 105 determines that the positioning result 1 acquired in Step S34 can be reused.

Therefore, the positioning request management unit 105 reuses the positioning result 1 acquired in Step S34 as a positioning result 2 for the positioning request 2 from the application 102 instead of making the GPS hardware control unit 104 carry out new positioning, and then returns this positioning result 2 to the application 102 (Step S37).

In this manner, according to the positioning control device 101 in the present embodiment, although positioning requests having a specified positioning accuracy are made from a plurality of applications 102 and 103, when a new positioning request is made from the application 102 or 103, in a case where the positioning accuracy specified in the new positioning request is equal to or less than the positioning accuracy of the latest positioning result determined in response to a prior positioning request, instead of newly carrying out positioning, the latest positioning result for responding the prior positioning request is returned, thereby making it possible to shorten the standby time of positioning requests and promptly return positioning results without lowering positioning accuracy.

In addition, according to this positioning control device 101, if a new positioning request is received before returning the latest positioning result for a prior positioning request, since the positioning result for responding the prior positioning request is returned in response to the new positioning request when the latest positioning result for responding the prior positioning request has been obtained, standby time of the new positioning request can be shortened further.

Although the present invention has been specifically explained based on the present embodiment as described above, the present invention is not limited to the above-mentioned present embodiment. For example, although the present embodiment was explained such that when a new positioning request is received, whether or not the latest positioning result can be reused is determined after waiting for the latest acquisition result to be acquired, whether or not the latest positioning result can be reused may also be determined when a new positioning request has been received.

In addition, although the present embodiment was explained such that in step S1, whether or not the latest positioning result can be reused is determined in a case where a new positioning request has been made before returning the latest positioning result to the application of the request origin, whether or not the latest positioning result can be reused may also be determined during the time until the elapsed time from returning the latest positioning result to the application of the request origin exceeds a threshold value N. Namely, there is considered to be little fluctuation in the current location for which positioning is carried out if the latest positioning result for a prior positioning request is returned within a prescribed amount of time. Consequently, in such cases, by returning the latest positioning result for responding a prior positioning request to a new positioning request, standby time of the new positioning request can be further shortened while inhibiting decreases in reliability of positioning results.

In addition, although the present embodiment was explained as having two types of modes for positioning accuracy composed of a quality-emphasized mode and a standard mode, the positioning accuracy modes may be divided into a larger number of mode types. Instead of a quality-emphasized mode and a standard mode, an allowed positioning error may be notified, for example, and positioning results may also be reused if positioning error is equal to or less than the allowed positioning error. The allowed positioning error may also be ranked in the manner of A, B and C.

In addition, although the present embodiment was explained such that whether or not the latest positioning result can be reused is determined in a case where a prior positioning request and a new positioning request have been transmitted from different applications, whether or not the latest positioning result can be reused may also be determined in a case where the prior positioning request and the new positioning request have been transmitted from the same application.

The disclosure of Japanese Patent Application No. 2008-274231 filed on Oct. 24, 2008 including specification, drawings and claims is incorporated herein by reference in its entirety.

What is claimed is:

1. A positioning control device that determines a current location based on positioning requests from a plurality of applications, comprising:
   a positioning unit configured to determine a current location at a positioning accuracy specified by an application; and
   a positioning request management unit configured to return a positioning result obtained by the positioning unit in response to the positioning request from the application,
   wherein when there is a new positioning request from the application, in a case where a positioning accuracy specified in the new positioning request is equal to or less than a positioning accuracy specified in a prior positioning request, the positioning request management unit is configured to return a positioning result for responding the prior positioning request, in response to the new positioning request.

2. The positioning control device according to claim 1, wherein in a case where a new positioning request is received before returning a positioning result in response to a prior positioning request, the positioning request management unit is configured to return the positioning result for responding the prior positioning request, in response to the new positioning request.

3. The positioning control device according to claim 1, wherein in a case where a new positioning request is received within a prescribed amount of time after returning a positioning result in response to a prior positioning request, the positioning request management unit is configured to return the positioning result for responding the prior positioning request, in response to the new positioning request.

4. A positioning control method for determining a current location based on positioning requests from a plurality of applications, comprising:
   a positioning step of determining a current location at a positioning accuracy specified by an application; and
   a positioning request management step of returning a positioning result obtained in the positioning step in response to the positioning request from the application,
   wherein when there is a new positioning request from the application, in a case where a positioning accuracy specified in the new positioning request is equal to or less than a positioning accuracy of a latest positioning result determined for a prior positioning request, the latest positioning result for responding the prior positioning request is returned in response to the new positioning request in the positioning request management step.

* * * * *